Figure 1:
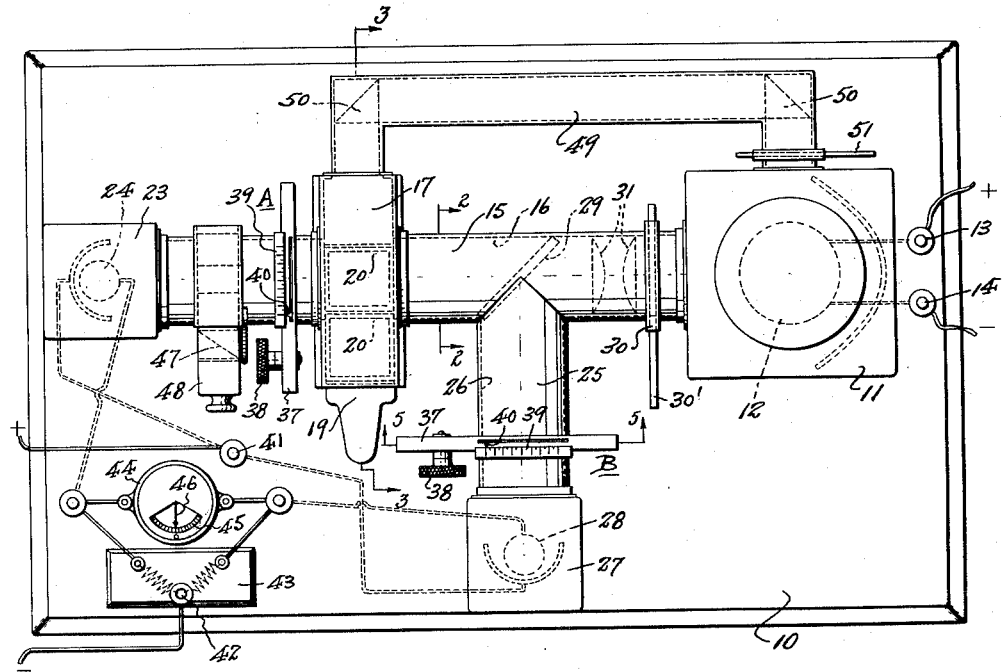

Aug. 28, 1934.   W. G. EXTON   1,971,443
ELECTROOPTICAL METHOD AND MEANS FOR MEASURING CONCENTRATIONS, COLORS, DISPERSIONS, ETC., OF FLUIDS AND SIMILAR SUBSTANCES
Filed April 29, 1930   2 Sheets-Sheet 1

INVENTOR.
William G. Exton,
BY
George D. Richards
ATTORNEY.

Aug. 28, 1934.  W. G. EXTON  1,971,443
ELECTROOPTICAL METHOD AND MEANS FOR MEASURING CONCENTRATIONS, COLORS,
DISPERSIONS, ETC., OF FLUIDS AND SIMILAR SUBSTANCES
Filed April 29, 1930  2 Sheets-Sheet 2

INVENTOR.
William G. Exton,
BY
George D. Richards
ATTORNEY.

Patented Aug. 28, 1934

1,971,443

UNITED STATES PATENT OFFICE

1,971,443

ELECTROOPTICAL METHOD AND MEANS FOR MEASURING CONCENTRATIONS, COLORS, DISPERSIONS, ETC. OF FLUIDS AND SIMILAR SUBSTANCES

William G. Exton, New York, N. Y.

Application April 29, 1930, Serial No. 448,235

3 Claims. (Cl. 88—14)

This invention relates, generally, to a novel optical method of measuring turbidities, colors and other characteristics of fluids, and to novel apparatus by means of which said method may be practised.

In my prior United States Letters Patent #1,644,330, dated October 4th, 1927 and #1,717,702 dated June 18th, 1929, and in other patents referred to therein, I have disclosed methods and instruments for measuring the concentration and other characteristics of fluids and other substances by their color or dispersion or by combinations of both color and dispersion. The methods originated by me, as exemplified in said prior patents, have been identified under the general name of scopometry in articels published in Archives of Pathology and Laboratory Medicine, January, 1928, vol. 5 pp. 49-65, and March 2, 1929, vol. 92 pp. 708-712. Scopometry as heretofore practised has relied upon the use of the human eye in determining measuring points. The present invention has for its principal object to provide a method and means whereby dependence upon the human eye may be dispensed with, and light sensitive electrical means may be utilized in place thereof in determining measuring points. With this object in view the present invention provides a method and means utilizing an electric eye, which may be of any known type, whatever their form or structure, so long as they are sensitive to light and give electrical evidence of being effected proportionally by light impinging upon their light sensitive components. Thus the photo-electric cell, in its several forms, may be used, and may be referred to as the photo-electronic eye because the light impinging on the light sensitive component thereof sets up a stream of electrons; and the photo-voltaic cell may be used, and may be referred to as the photo-ionic eye because the light impinging on its light sensitive component sets up a stream of ions. In both cases the electrical effect is assumed to be proportional to the impinging light, and may consequently serve as the measuring criteria in the examination of fluids and other substances by the method involved in scopometry.

Another object of this invention is to provide a novel method for measuring the color or turbidity density of fluids, the apparatus utilizing a pair of light sensitive devices separately illuminated from a common light source, and simple and comparatively stable means for electrically connecting said devices so that their electrical effects may be balanced one against the other and suitably indicated, and wherein modification of the light streams by a fixed factor in one stream, such as a "blank" of distilled water, and by a variable factor in the other stream, such as a manipulatable adjustable shutter, are used to determine a balanced condition of the light excited electrical effects of the light sensitive devices preliminary to measuring operations, thus freeing the apparatus from the effects of accidental variables, such as differences in glass cups for holding fluids, finger smudges on fluid holders, dirt, dust or smudges on optical elements and like conditions; all whereby a predetermined calibration based on criteria obtained from measurement in the balanced apparatus of a fluid of known density or concentration, may be utilized as a standard against which to refer criteria obtained from similar measurements in the balanced apparatus or like fluid of unknown density or concentration.

Another object of this invention is to provide an apparatus utilizing light sensitive electrical means interconnected by a simple Wheatstone bridge or equivalent circuit so as to permit balancing of their electrical effects by changes of applied light values, and wherein electrical accessories are reduced to a minimum, so that the use of batteries with their permanent and temporary connections, potentiometers, amplification devices with their accessories and other devices producing variable conditions are avoided.

This invention has for a further object to provide an apparatus for the purposes stated in which the variability in the source of light which occurs from fluctuations in line voltage of the electrical service source are eliminated either by balancing against one another the effects produced on two similar light sensitive devices from a common source of illumination, or by opposing the action of light sensitive devices in such way that a constant ratio is preserved between them, thus affording a constancy of calibration which constitutes a null method and by which a null method is alone obtained.

Other objects of this invention, not at this time more particularly enumerated, will be understood from the following detailed description.

Illustrative embodiments of novel apparatus for practising the method of this invention are shown in the accompanying drawings, in which:—

Figure 5:
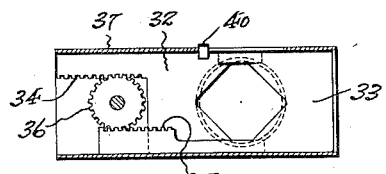
Figure 3:
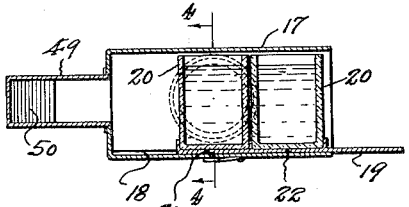
Figure 4:
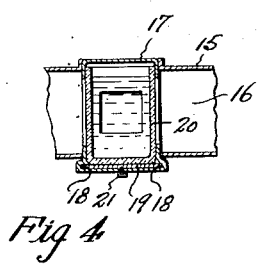
Figure 2:
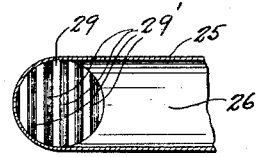

Figure 1 is a semi-diagrammatic plan view of one form of apparatus according to this invention adapted for measurement of fluids and other substances by their colors or dispersions; Figure 2 is a detail fragmentary sectional view, taken on line 2—2 in Figure 1; Figure 3 is a fragmentary sectional view, taken on line 3—3 in Figure 1; Figure 4 is a fragmentary sectional view, taken on line 4—4 in Figure 3; and Figure 5 is a fragmentary sectional view, taken on line 5—5 in Figure 1.

Figure 6:
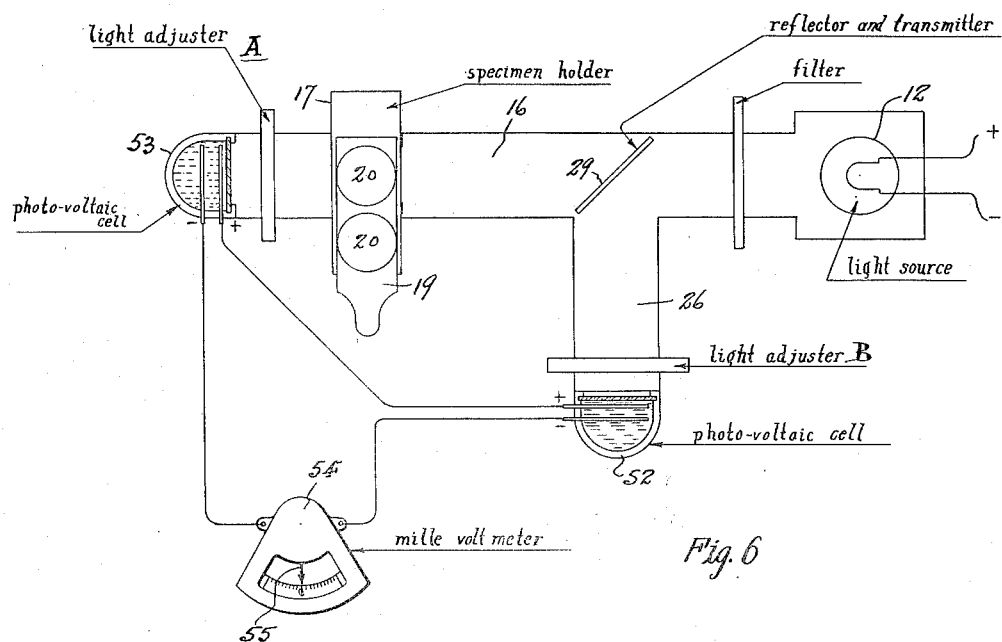

Figure 6 is a diagrammatic plan view of a modified form of apparatus, with electrical connections and arrangements adapting the same to the utilization of photo-voltaic cells.

Similar characters of references are employed in the above described views, to indicate corresponding parts.

Referring now to Figures 1 to 5 inclusive, more especially, the reference character 10 indicates a suitable base on which is mounted a light source housing 11. Arranged within this housing 11 is an electric lamp 12, preferably of the incandescent type. Suitable electrical connections 13 and 14 are provided for including said lamp in circuit with a source of electric current, such as the usual commercial current distributing lines. Communicating with said housing 11, at a point opposite the lamp 12, and extending forward therefrom is a tubular member 15, the interior of which provides a passage 16 to be traversed by the light emanating from said lamp. Connected with said tubular member 15 so as to intersect said passage 16 is means to hold the fluid or substance to be examined. This means is subject to considerable variation as to form. Illustrative of a convenient form thereof, I have shown the same to comprise a transverse receiving chamber 17 having in its lower side channeled slideways 18 to slidably receive a carrier plate 19, on which may be suitably fixed one or more transparent cups 20 to contain the fluid to be examined. Preferably two such cups are provided, one to receive a fluid of fixed characteristic, hereinafter referred to as the "blank" and the other to receive the specimen of fluid to be examined. Yieldable stop means may be provided to assist in selectively locating the cups in the path of light traversing the passage 16. Such stop means may comprise a spring pressed pin 21 fixed on the receiving chamber 17 and adapted to engage with positioning depressions 22 with which the carrier plate 19 is provided.

Mounted on said base 10 to communicate with the forward end of said tubular member 15, is a housing 23, and arranged therein, in exposure to light traversing the passage 16, is a light sensitive device in the form of a photo-electric cell 24.

Connected in communication with said tubular member 15, at a point intermediate the light source and position of the specimen to be examined is a branch arm 25 of said tubular member 15, preferably extending at right angles thereto. Mounted on said base 10, so as to communicate with the passage 26 of said branch arm 25, is a housing 27, and arranged therein, in exposure to light directed through said passage 26, is a light sensitive device also in the form of a photo-electric cell 28. Arranged within the intersection of said branch arm 25 with said tubular member 15 is means 29 to divide the light from the light source, whereby part of the same traverses the passage 26 of the one and part the passage 16 of the other. This light dividing means may be of various forms, as, for example, a transparent glass panel set at an angle of forty-five degrees, whereby light will both traverse the same to extend through the passage 16, and be reflected from the rearward surface of the same to extend through the passage 26. If desired the light dividing means may comprise a transparent glass panel having equi-spaced silvered reflecting panels 29' (see Figure 2), whereby said panels reflect light through the passage 26 and the intermediate transparent sections transmit light on through the passage 16.

Arranged in connection with the tubular member 15 is a transverse slideway 30 in which may be inserted a desired filter 30' for disposition across the path of light emanating from the lamp 12. Also in the path of light emanating from the lamp 12, at a point intermediate the lamp and said light dividing means 29, there may be placed suitable lenses 31 for maintaining the light rays parallel as the same traverse the passage 16.

Connected with the branch arm 25, intermediate the light dividing means 29 and the photo-electric cell 28, is a light adjusting, regulating or modifying means B. This means is also subject to considerable variation as to form. Illustrative of one form thereof, the same comprises a pair of oppositely moving shutter plates 32 and 33 each having V-shaped ends. One plate has a rack 34 and the other a rack 35 which respectively mesh with actuating gear 36 journaled in connection with the slideway 37 in which said plates are movable, and actuated by the knob 38. The slideway is transversely disposed in connection with the branch arm 25, so that the V-shaped ends of the shutter plates are movable one toward the other across the light traversed passage 26. As the V-shaped ends of the plates are moved relative one to the other the light transmitting aperture formed thereby may be decreased at will to reduce to desired degree the amount of light effectively transmitted to the photo-electric cell 28. The degree of movement of the shutters and consequently the amount of light transmitted thereby is indicatable by providing a suitably calibrated scale 39 with reference to which an indicator 40 movable with the shutters cooperates. While the described light adjusting means is quite satisfactory, any other form of means found convenient for varying the light transmitted to the photo-electric cell 28 may be employed.

A similar light adjusting, regulating or modifying means A is connected with the tubular member 15 and its passage 16, to adjust and control the light transmitted to the photo-electric cell 24.

The electrical circuit serving the photo-electric cells includes an input connection 41 and an output connection 42. Between these connections is a Wheatstone bridge or balance, two arms of which extend from the input connection 41 and respectively include the photo-electric cells 24 and 28, and the other two arms of which are provided by a ratio arm box 43 (such, for example, as that made by the General Radio Company, Type 210) connected with the output connection 42. Connected across the Wheatstone bridge or balance thus formed is a galvanometer 44 having a scale 45 provided with a center zero reading and a movable needle or indicator arm 46 cooperating with said scale.

If it is desired to obtain light polarizing effect on light transmitted through a fluid under examination, a Nicol prism 47 is provided, the same being mounted in a suitable holder 48 which is adjustable across the passage 26 so as to insert in or remove from the path of light the said Nicol prism according as use thereof may or may not be desired.

The method of making examination of a fluid desired to be measured is as follows:—

The light source or lamp 12 being active, a fluid to be used as a "blank", such, for example, as distilled water, is placed in one of the transparent cups 20 and aligned with the light passage 26, and the light adjusting means A is adjusted to a desired open position whereby the light traversing the "blank" is directed upon the photo-electric cell 24. The light adjusting device B is now manipulated to so modify the light transmitted to the photo-electric cell 28 that its energy output balances that of the photo-electric cell 24, this condition being indicated by the galvanometer indicator arm 46 coming to rest at zero on the galvanometer scale. This step determines the balance of the cells on said blank of distilled water. Preliminary to measurement of fluid of unknown density or concentration, and with the electrical effects of the cells balanced, a specimen of the same kind of fluid, the density or concentration of which is known, is substituted in place of the "blank", and is measured in manner subsequently set forth as to measurement of fluid of unknown density or concentration, to obtain a reading from which to calibrate comparison criteria. This comparison calibration once being established, many successive measurements of specimens of fluid of the same kind but of unknown density or concentration may thereupon be made as desired and the apparatus readings compared with the established comparison calibration. By thus once establishing the comparison calibration, standardizing difficulties are eliminated; a matter of especial advantage when dealing with materials that do not keep or which must be synthesized at great expense. Hemoglobin is an example of material of the first type, and Indican is an example of material of the second type. The specimen of fluid of unknown density or concentration desired to be measured is now placed in the other cup 20 and interposed in the path light transmitted to photo-electric cell 24 in place of the blank. The specimen being different from the blank will modify the light so transmitted, thereby upsetting the balance between the photo-electric cells, and will consequently cause a deflection of the galvanometer indicator arm 46 to one side or the other of the zero reading of the scale 45. After this procedure there are several ways of deriving criteria for determining the measurement of the fluid for desired characteristic. One way consists in manipulating light adjusting means A to so modify the light transmitted to photo-electric cell 24 through the specimen, as to again bring the galvanometer indicator arm to zero position, and thereupon read the result on the scale of said light adjusting means A, and from such reading the measurement of the unknown is picked off a calibration made from previous measurements of different concentrations of the same kind of material as that examined. Another way of proceeding after the photo-electric cells are balanced on a blank, is to provide in the respective specimen cups 20, two specimens, one a known standard and one the unknown specimen of similar material; thereupon measure both specimens by manipulation of light adjusting means A taking the scale reading for each. The difference between the readings will give the criteria for calibrating the unknown specimen. By providing two specimen cups quickly and selectively movable into the light path, as shown in the drawings, the last mentioned procedure may be made very rapidly, with the advantage that both readings may be obtained before any variable condition, such as might be caused by fatigue of the light sensitive cell, can arise. The above described methods can be considered null in the strictest sense of the term.

Another way of obtaining measurement criteria is to balance the photo-electric cells on a blank as before stated, but with the light adjusting means A wide open, then insert the specimen to be examined, which will modify the light transmitted to photo-electric cell 24, and will deflect the galvanometer indicator arm, then leaving the light adjusting means A in wide open condition, adjust the light adjusting means B until the galvanometer indicator arm returns to zero, whereupon the measurement criteria is taken from the scale of light adjusting means B.

Note that in the first two procedures described, the condition under which the readings are taken is always the same as regards the amount of light transmitted to cells and regardless of the nature of the particular specimen under examination, thus making the same truly null methods. These procedures also assure that cells are used under conditions where they are least subject to fatigue and other changes and also in the region where they are most sensitive. In the last described procedure, where the light adjustment is made on cell 28, this is not so since the amount of light on the cells at points where the reading is taken will vary with the specimen.

Measurements of fluid to determine size of submicroscopic particles in suspension therein may be attained by transmitting the light with Tyndal beam effect upon the specimen, for reflection from such particles in suspension therein to the photo-electric cell 24. To this end means are provided for producing Tyndal beam effect when desired, the same comprising an auxiliary tubular passage 49 having suitable reflectors 50, whereby light from the lamp 12 is transmitted to and through the specimen examined in a path at right angles to the direct path of light through the main passage 16 of tubular member 15. Said auxiliary tubular passage 49, at a point adjacent to its connection in communication with the housing 11, is provided with a slidable shutter 51, whereby light may be cut off from entering said passage 49 at will.

Referring now to Figure 6, I have shown a form of the apparatus above described in which a different type of light sensitive electrical devices in the form of photo-voltaic cells are employed in place of the photo-electric cells 24 and 28. One such photo-voltaic cell 52 is mounted at the free end of the branch arm 25, and another photo-voltaic cells 53 is mounted at the end of the tubular member 15. The electrical circuit including these cells is so arranged that the positive poles thereof are connected together, and their negative poles are connected with a mille volt meter 54 having an indicator arm 55 cooperating with a scale provided with a center zero indication. As thus arranged the cells buck one another to give a constant ratio which eliminates the effects of fluctuations in the line voltage serving the light source lamp 12.

In the use of the apparatus thus modified, the measurement criteria are obtained by the same procedures as already above described, but the greater output of the photo-voltaic cells enables the use of an electrical meter a hundred times less sensitive, making the instrument, as to its electrical features, more rugged. It also eliminates the ratio arm and voltage that must be applied to the plates of photo electric cells. If desired a mille volt meter with interposed high resistance may be used as the electrical meter, such arrangement having the advantage of not drawing current from the cells. Any form of meter such as a microammeter may be utilized to obtain direct readings from the electrical meter, instead of employing such meter merely as a device for indicating the matching or end point at which some other scale indicator is read.

In both types of apparatus, i. e. whether employing photo-electric cells or photo-voltaic cells, no batteries, potentiometers, amplifying devices with accompanying accessories, etc., are needed; nor are electrical manipulations or adjustments or temporary electrical connections required in either the preparation of the instrument for use or in the ultimate measurement procedure. Fluctuations in line voltage of the light source circuit do not cause detrimental variation of measuring conditions, in the use of the instrument, since the two cells are balanced or opposed with light from the same source of illumination.

As many changes could be made in the construction of the instrument and many apparently widely different embodiments of this invention could be made without departing from the scope thereof, it is intended that all matter contained in the above description or shown in the accompanying drawings shall be interpreted as illustrative and not in a limiting sense.

I claim:—

1. A method for measuring the color or turbidity density of fluids, comprising dividing light from a single source and transmitting the respective streams thereof each to a separate electrical light sensitive device, which light sensitive devices are electrically connected so that their electrical effects may be balanced against each other and the condition of balance indicated on an electrical meter; interposing in one light stream a fluid "blank" and thereupon modifying the light effects on the light sensitive devices to bring the electrical effects of the latter into balance, thereby eliminating any variables in the instrumentalities employed; then substituting for the fluid "blank" in the one light stream a fluid of the kind to be measured having known density or concentration, thereupon again modifying the light effects on the light sensitive devices to bring the electrical effects of the latter again into balance, utilizing indicating means cooperating with the light modifying means to obtain a reading for calibration of comparison criteria; and finally substituting in the one light stream for said known fluid the fluid of unknown density or concentration to be measured, thereupon again modifying the light effects on the light sensitive devices to bring the electrical effects of the latter into balance, again utilizing said indicating means to obtain readings to be referred to the calibrated criteria furnished by the measurement of said known fluid.

2. In an apparatus for measuring the color or turbidity of fluids, a single source of light, means to provide separate light streams emanating from said single source, an electrical light sensitive device mounted in the path of each light stream, an electric meter, a Wheatstone bridge circuit including a pair of fixed resistances, each of said resistances being connected in series with a respective one of said light sensitive devices, said circuit serving to electrically interconnect said light sensitive devices and said meter so that electrical effects of said devices may be balanced one against the other and indicated by said meter, a transparent fluid container, means for removably holding said fluid container and its content in the path of one light stream whereby the light value of said stream is modified to in turn modify the electrical effect of the light sensitive device served by said stream, manipulatable means for modifying the light value of the other light stream to balance the electrical effect of the light sensitive device served thereby with the aforesaid modified electrical effect of said first mentioned light sensitive device, and said latter means having means to indicate the degree of light modification produced, thereby providing readings for measurement criteria.

3. In an apparatus for measuring the color or turbidity of fluids, a single source of light, means to provide separate light streams emanating from said single source, an electrical light sensitive device mounted in the path of each light stream, an electrical meter, a Wheatstone bridge circuit including a pair of fixed resistances, each of said resistances being connected in series with a respective one of said light sensitive devices, said circuit serving to electrically interconnect said light sensitive devices and said meter so that electrical effects of said devices may be balanced one against the other and indicated by said meter, a transparent fluid container, means for removably holding said fluid container and its content in the path of one light stream whereby the light value of said stream is modified to in turn modify the electrical effect of the light sensitive device served by said stream, manipulatable means in the path of this same stream for quantitatively controlling the light delivered to the light sensitive device served by said stream, manipulatable means for modifying the light value of the other light stream to balance the electrical effect of the light sensitive device served thereby with the aforesaid modified electrical effect of said first mentioned light sensitive device, and said first and second named manipulatable means having independent means to indicate the degree of light modification produced, thereby providing readings for measurement criteria.

WILLIAM G. EXTON.